(12) United States Patent
Koenig

(10) Patent No.: US 6,250,577 B1
(45) Date of Patent: Jun. 26, 2001

(54) BEARING APPARATUS FOR AXIALLY STRESSING A ROTOR ELEMENT CARRIED ON A ROTOR SHAFT

(76) Inventor: Larry E. Koenig, c/o Komar Industries, Inc. 4425 Marketing Pl., Groveport, OH (US) 43125

(*) Notice: Subject to any disclaimer, the term of this patent is extended or adjusted under 35 U.S.C. 154(b) by 0 days.

(21) Appl. No.: 09/327,879

(22) Filed: Jun. 8, 1999

(51) Int. Cl.[7] .................................................. B02C 7/02
(52) U.S. Cl. .......................................... 241/239; 241/295
(58) Field of Search .................................. 241/236, 295; 384/542, 584

(56) References Cited

U.S. PATENT DOCUMENTS

| Re. 33,490 | 12/1990 | Steinbock | 29/116.2 |
|---|---|---|---|
| 199,121 | 1/1878 | Sweeney . | |
| 707,176 | 8/1902 | Steiner . | |
| 1,398,219 | 11/1921 | Acheson . | |
| 1,936,894 | 11/1933 | Whiteley | 308/240 |
| 3,235,316 | 2/1966 | Whanger | 308/8.2 |
| 3,866,987 | 2/1975 | Garner | 308/8.2 |
| 4,486,104 | 12/1984 | Vezirian et al. | 384/95 |
| 4,499,642 | 2/1985 | Vezirian et al. | 29/149.5 R |
| 4,846,614 | 7/1989 | Steinbock | 411/307 |
| 4,923,323 | 5/1990 | Steinbock | 403/261 |
| 5,075,950 | 12/1991 | Steinbock | 29/426.5 |
| 5,083,889 | 1/1992 | Steinbock | 411/432 |
| 5,313,742 * | 5/1994 | Corcoran, Jr. et al. | 51/206 R |
| 5,322,372 | 6/1994 | You et al. | 384/293 |
| 6,000,852 | 12/1999 | Koenig | 384/282 |

OTHER PUBLICATIONS

Superbolt literature from the internet site www.Superbolt.com, Jan. 2001.*
Superbolt–Fastening, Bolting, Tensioners Literature, Mar. 1999.

* cited by examiner

Primary Examiner—Allen Ostrager
Assistant Examiner—William Hong
(74) Attorney, Agent, or Firm—Standley & Gilcrest LLP

(57) ABSTRACT

The present invention relates to a journal bearing apparatus that is specifically configured to apply an axial load on a rotor element carried on the rotor shaft. The invention includes a bearing cylinder concentrically positioned on the rotor shaft between the rotor element and a first end of the rotor shaft, where the bearing cylinder includes a plurality of axially extending threaded bores distributed about the rotor shaft and extending completely through the bearing cylinder and also includes a plurality of recesses formed into the outer circumferential surface of the bearing cylinder; a pressure ring concentrically positioned on the rotor shaft between the bearing cylinder and the rotor element; a retainer for preventing the bearing cylinder from moving axially along the rotor shaft away from the rotor element; a plurality of jack screws threaded into the plurality of threaded bores, and forcing the pressure ring and bearing cylinder away from one another, thereby forcing the pressure ring axially against the rotor element; and a plurality of bearing inserts made of a self-lubricating abrasion-resistant polyamide material, where each of the inserts are positioned within a respective one of the plurality of recesses on the circumferential surface of the bearing cylinder so as to provide a bearing surface on the bearing cylinder.

41 Claims, 8 Drawing Sheets

BEARING APPARATUS FOR AXIALLY STRESSING A ROTOR ELEMENT CARRIED ON A ROTOR SHAFT

BACKGROUND

The present application relates to bearing assemblies, and more particularly, rotor bearing assemblies capable of stressing a rotor element in an axial direction.

Shear shredder machines, briquetting machines, grinding machines and other types of material processing machines typically use a plurality of meshing, substantially parallel, counter-rotating roller assemblies. Typically, each of the roller assemblies includes a substantially cylindrical, material processing roller member mounted to a rotating shaft. For example, in a shear shredding apparatus, the roller member is a stack of cutter disks separated by spacer disks. Each of the roller assemblies is supported on a frame by a pair of supports mounted on ends of the frame. Each of the supports includes a bearing housing journaling a cylindrical bearing member mounted for simultaneous rotation with the shaft of the associated roller assembly.

Conventional bearing assemblies for use with such material processing devices commonly utilize roller-bearing components, such as tapered roller bearings, which bear axial as well as radial loads. A disadvantage with such roller bearing components is their expense and relatively short life span at high loading. Another disadvantage of such roller bearing components is that they provide a limited surface area for bearing the load of the rotational member. Another known disadvantage with conventional roller bearing components is that, as the roller bearing components wear, eventually necessary to replace the entire roller bearing assembly, which is expensive and time consuming. Accordingly, there is a need for a bearing assembly that has a greater life span than comparably sized roller bearing assemblies, that is less expensive than conventional roller bearing assemblies, that provides a greater surface area to bear the load of the counter-rotating members, and that is relatively easy and inexpensive to rebuild or re-furbish.

Additionally, conventional shear shredding and other material processing devices utilize stack tighteners on the ends of the rotating shafts. Such stack tighteners act to maintain the stack of cutting disks or other material processing roller members together in a compact relationship on the shear cartridge or roller assembly. With such an arrangement, a separate bearing member is positioned either axially within one of the stack tighteners or axially outside the stack tightener. Accordingly, the size of the shear shredding or material processing apparatus is partly dictated by such arrangement.

SUMMARY

The present invention is a journal bearing apparatus that is specifically configured to apply an axial load on a rotor element carried on the rotor shaft. One specific embodiment of the present invention is a combination journal bearing and stack tightener apparatus.

The apparatus of the present invention includes a bearing cylinder concentrically positioned on the rotor shaft between the rotor element and a first end of the rotor shaft, where the bearing cylinder includes a plurality of axially extending threaded bores distributed about the rotor shaft and extending completely through the bearing cylinder and includes an outer circumferential bearing surface; a pressure ring concentrically positioned on the rotor shaft between the bearing cylinder and the rotor element; a retainer for preventing the bearing cylinder from moving axially along the rotor shaft away from the rotor element; and a plurality of jack screws threaded into the threaded bores for forcing the pressure ring and bearing cylinder away from one another, thereby forcing the pressure ring axially against the rotor element. The bearing cylinder may be a plain bearing cylinder or may incorporate roller bearing elements distributed circumferentially thereabout.

In another embodiment, the apparatus of the present invention includes a bearing cylinder concentrically positioned on the rotor shaft between the rotor element and a first end of the rotor shaft, where the bearing cylinder includes a plurality of axially extending threaded bores distributed about the rotor shaft and extending completely through the bearing cylinder and also includes a plurality of recesses formed in the outer circumferential surface of the bearing cylinder; a pressure ring concentrically positioned on the rotor shaft between the bearing cylinder and the rotor element; a retainer for preventing the bearing cylinder from moving axially along the rotor shaft away from the rotor element; a plurality of jack screws threaded into the threaded bores for forcing the pressure ring and bearing cylinder away from one another, thereby forcing the pressure ring axially against the rotor element; and a plurality of bearing inserts made of a self-lubricating, abrasion-resistant polyamide material, where each of the inserts is positioned within a respective one of the plurality of recesses on the circumferential surface of the bearing cylinder to provide a bearing surface on the bearing cylinder.

Preferably, each of the bearing inserts includes a portion protruding radially from the corresponding one of the recesses. The inserts are formed from a reinforced carbon-fiber filled polyamide resin material and extend in a substantially axial direction along substantially the entire axial length of the bearing cylinder. The inserts are substantially oblong in shape. Also, it is preferred that the pressure ring is made from a hardened metallic material.

In an alternate configuration of the above embodiment, the bearing cylinder includes an annular depression or recess extending into the inner side surface of the bearing cylinder, where each of the plurality of axially extending threaded bores open into this annular depression, and the pressure ring includes an annular portion extending into the annular depression. Accordingly, by recessing an annular portion of the pressure ring partially into the annular depression, the pressure ring will act like a piston to substantially prevent the build up of contaminants between the jack screws and the pressure ring.

In another embodiment of the present invention, a bearing assembly that includes an outer cylindrical race having an inner cylindrical bearing surface; and a rotor shaft carrying a rotor element thereon; a bearing cylinder concentrically positioned on the rotor shaft between the rotor element and a first end of the rotor shaft and journaled by the cylindrical race, where the bearing cylinder includes a plurality of axially extending threaded bores distributed about the rotor shaft and extending completely therethrough and a plurality of recesses formed into the outer circumferential surface of the bearing cylinder; a pressure ring concentrically positioned on the rotor shaft between the bearing cylinder and the rotor element; a retainer for preventing the bearing cylinder from moving axially along the rotor shaft away from the rotor element; a plurality of jack screws threaded into the plurality of threaded bores and forcing the pressure ring and bearing cylinder away from one another, thereby forcing the pressure ring axially against the rotor element; and a plurality of bearing inserts made from a self-lubricating abrasion-resistant polyamide material, where each of the inserts are positioned within a corresponding one of the recesses so as to provide a bearing surface on the bearing cylinder facing the inner cylindrical bearing surface of the outer cylindrical race.

Preferably, each of the inserts include a portion protruding radially out from the corresponding one of the plurality of recesses, the inserts are formed from a reinforced carbon-fiber filled polyamide resign material, the inserts extend in a substantially axial direction approximately along the entire axial length of the bearing cylinder, and the inserts are substantially oblong in shape.

The cylindrical race is preferably mounted to a frame, where the frame has an opening for receiving at least the rotor shaft therethrough; and the bearing assembly preferably includes an annular seal extending radially inward from the opening in the frame, where the annular seal abuts an outer circumferential surface of the pressure ring or abuts an outer circumferential surface of a seal ring concentrically positioned on the rotor shaft between the rotor element and the pressure ring.

In an alternate configuration of this embodiment, the bearing cylinder may include an annular depression extending into the side surface of the bearing cylinder, where each of the axially extending bores open into the annular depression; and the pressure ring includes an annular portion extending into this annular depression. In this alternate configuration, the portion of the pressure ring recessed into the annular depression of the bearing cylinder acts like a piston so as to reduce the amount of contamination build up between the jack screws and the pressure ring.

In a specific embodiment of the present invention, a combination stack tightener and journal bearing assembly is provided, which is for use with a shear shredder cartridge of a shear shredder apparatus, where the shear shredder cartridge includes a rotor shaft and a stack of cutter disks and associated spacer disks positioned on the rotor shaft. The combination stack tightener and journal bearing assembly of the present embodiment includes a retainer flange adapted to be fixedly mounted approximate the first end of the rotor shaft; a pressure ring adapted to be positioned on the rotor shaft between the retaining flange and the stack of cutter disks; a bearing cylinder adapted to be positioned on the rotor shaft between the retaining flange and the pressure ring, where the bearing cylinder includes a central bore adapted to receive the shaft therethrough, a plurality of axially extending threaded bores distributed about the central bore and extending completely therethrough, and a plurality of recesses formed onto the outer circumferential surface of the bearing cylinder; a plurality of jack screws threaded into the plurality of threaded bores so as to force the pressure ring and bearing cylinder away from one another, thereby securing the bearing cylinder against the retainer flange and the pressure ring against the stack of cutter disks; and a plurality of bearing inserts made of a self-lubricating abrasion-resistant polyamide material positioned within the respective plurality of recesses and shaped such that a portion of each insert protrudes above the circumferential surface of the bearing cylinder, thereby providing a bearing surface on the bearing cylinder.

Preferably, the combination stack tightener and journal bearing assembly of the present embodiment further includes a seal ring adapted to be positioned on the rotor shaft between the stack of cutter disks and the pressure ring. Furthermore, it is preferred that the recesses for receiving the bearing inserts are oblong in shape and extend in an axial direction and are spaced substantially evenly about the outer circumferential surface of the bearing cylinder. Further, it is preferred that the bearing inserts are formed from a solid, reinforced carbon-fiber filled, self-lubricating polyamide resin material.

In another specific embodiment of the present invention, a shear cartridge for a shear shredder apparatus includes the rotor shaft; a stack of cutter disks and associated spacer disks received on the rotor shaft; and at least one stack tightener positioned on an end of the rotor shaft and applying pressure upon the stack of cutter disks positioned between the stack tightener and an opposite end of the shaft. The stack tightener includes a bearing cylinder positioned on the rotor shaft which includes a central bore receiving the rotor shaft, a plurality of axially extending, treaded bores distributed around the central bore and extending completely through the bearing cylinder, and a plurality of recesses formed into the outer circumferential surface of the bearing cylinder; a pressure ring positioned on the shaft between the bearing cylinder and the stack of cutter disks; a means for preventing the bearing cylinder from sliding axially on the rotor away from the stack of cutter disks; a plurality of jack screws threaded into the plurality of threaded bores so as to form the pressure ring and bearing cylinder away from one another thereby securing the pressure ring against the stack of cutter disks; and the plurality of bearing inserts made of a self-lubricating, abrasion-resistant polyamide material respectively positioned within the plurality of recesses and shaped such that a portion of each insert protrudes radially above the outer circumferential surface of the bearing cylinder, thereby providing an outer bearing surface on the bearing cylinder.

Accordingly, it is an object of the present invention to provide a journal bearing that provides a greater life span than comparably sized roller bearings, that is less expensive than comparably sized roller bearing assemblies, that provides greater bearing surfaces than comparably sized roller bearing assemblies. It is also an object of the present invention to provide a journal bearing that is configured to apply an axial load onto a rotor element carried by the rotor shaft. It is also an object of the present invention to provide a journal bearing that is easily rebuildable or refurbishable, independent of variations in the diameter of the outer race of the journal bearing. These and other objects are advantages of the present invention as will be apparent from the following description, the accompanying drawings and the appended claims.

DETAILED DESCRIPTION

Figure 1:
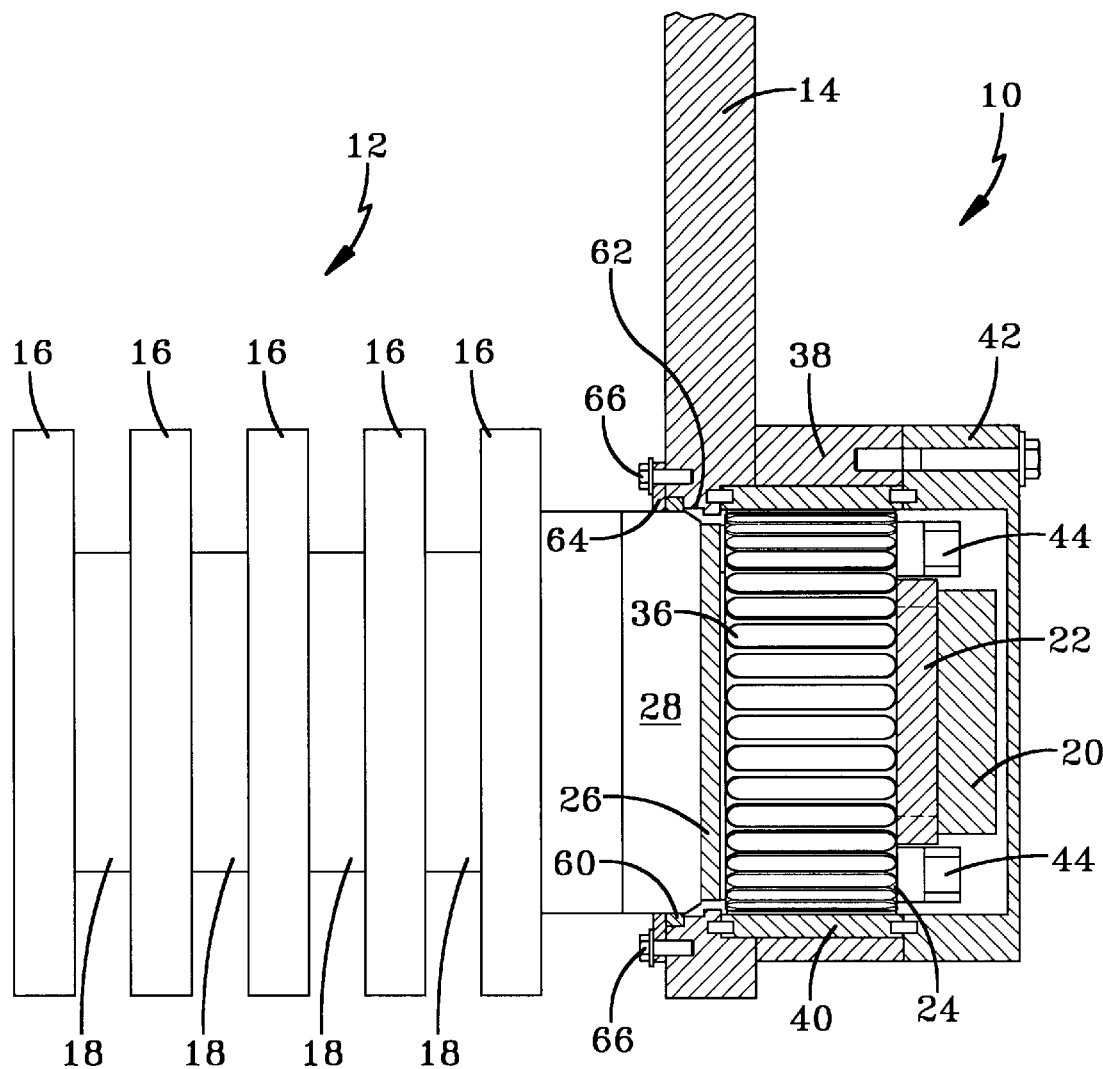
FIG. 1 is a cross-sectional top view of a portion of a material processing apparatus and roller assembly, showing a combination stack-tightener and journal bearing assembly according to a specific embodiment of the present invention.

As shown in FIG. 1, the first embodiment of the present invention is a combination stack tightener and journal bearing assembly 10 for use with a shear shredder cartridge 12 carried for rotation on the frame 14 of a shear shredding apparatus. Although the invention is described for use with a shear shredding apparatus, as shown in FIG. 1, it is within the scope of the invention that the combination stack tightener and journal bearing assemblies described herein may be used with other material processing apparatuses such as briquetting machines, grinding machines, and the like. As will be apparent to those of ordinary skill in the art, the combination stack tightener and journal bearing assemblies described herein may also be used for axially stressing other rotor elements carried on a rotor shaft such as an auger, for example.

The shear shredding cartridge 12 shown in FIG. 1 includes a plurality of cutter disks 16 and associated spacer disks 18 stacked together for rotation upon a rotating shaft 20. The combination stack tightener and journal bearing 10 acts to secure the stack of cutting disks and spacer disks 16, 18 in a compact relationship on the shear cartridge 12. The combination stack tightener and journal bearing assembly 10 also provides a bearing for the shear shredder cartridge to be journaled within the frame 14.

The combination stack tightener and journal bearing assembly 10 includes a split retaining ring 22 fixedly attached to an end of the rotating shaft 20, a bearing cylinder 24 positioned on the shaft between the split retaining ring 22 and the stack of cutter disks, a pressure ring 26 in the form of a hardened washer positioned on the rotating shaft 20, adjacent the bearing cylinder 24, between the bearing cylinder and the stack of cutter disks, and a hardened seal disk 28 positioned between the stack of cutter disks and the hardened washer 26.

Figure 2:
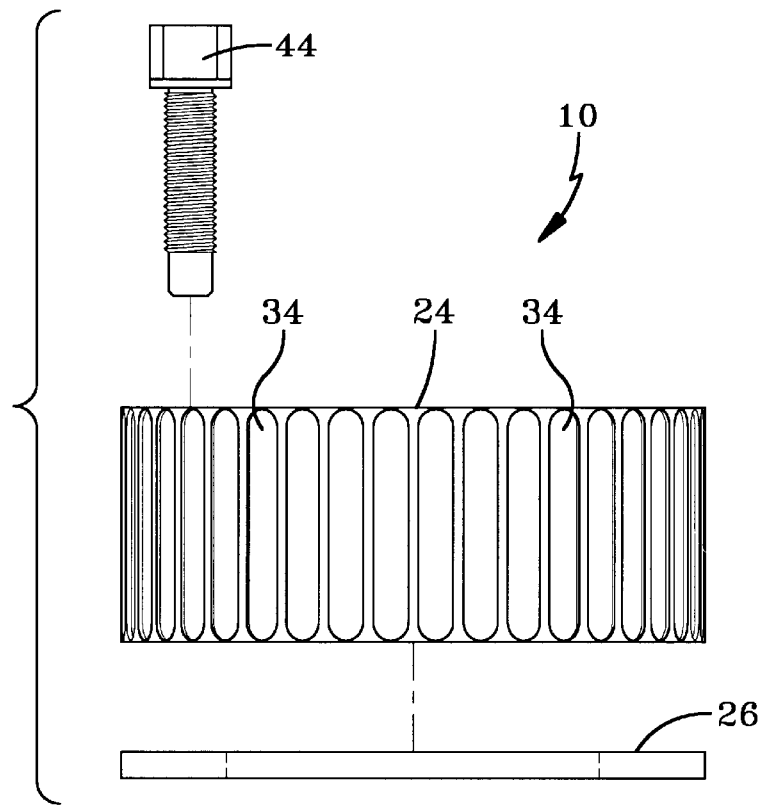
FIG. 2 is an exploded top plan view of the bearing cylinder, jack-screw and hardened washer components of the combination stack-tightener and journal bearing assembly of FIG. 1.
Figure 3:
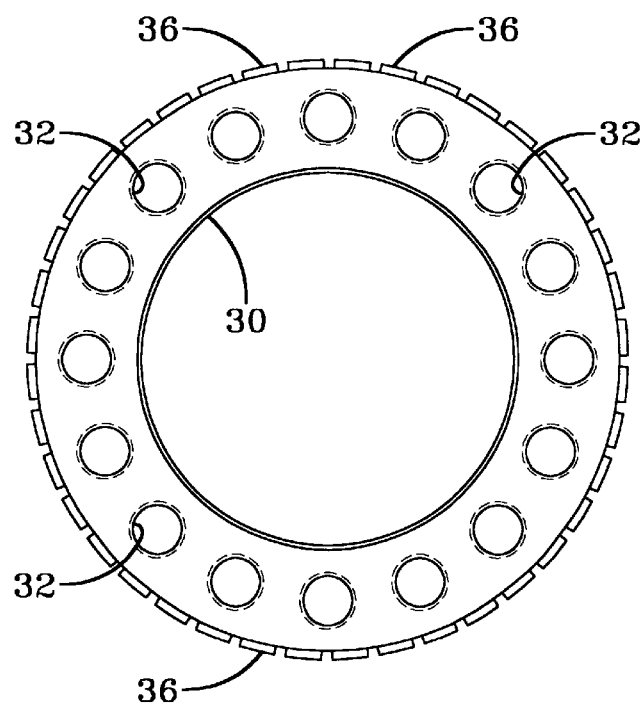
FIG. 3 is a side view of the bearing cylinder of the combination stack-tightener and journal bearing assembly of FIG. 1, including the bearing inserts positioned about the outer circumferential surface thereof.

Referring to FIGS. 1–3, the bearing cylinder 24 includes a central bore 30 receiving the shaft 20 therethrough, a plurality of axially extending threaded bores 32 distributed circumferentially about the central bore 30 and extending completely through the bearing cylinder, and a plurality of oblong shaped recesses 34 formed into the outer circumferential surface of the bearing cylinder 24. Preferably, the recesses 34 extend axially along the width of the bearing cylinder 24. Each of the recesses receives a substantially abrasion-resistant, self-lubricating, solid bearing insert 36, which preferably protrudes slightly above the circumferential outer surface of the bearing cylinder, thereby providing a plurality of outer bearing surfaces on the bearing cylinder. Preferably, the solid, abrasion resistant, self-lubricating material is a reinforced carbon-fiber filled polyamide resin material such as Aurum, commercially available from Mitsui Toatsu Chemicals, Inc. as JCN 3030.

The frame 14 is provided with an annular collar 38 which concentrically supports an annular wear sleeve 40 made from a hardened metal material. The wear sleeve 40 journals the bearing cylinder 24, thereby providing an inner raceway for the bearing cylinder. Further, a cap 42 is bolted over the collar 38 to enclose the rotating shaft 20 and combination stack tightener and journal bearing assembly 10.

The combination stack tightener and journal bearing assembly 10 also includes a plurality of jack screws 44, each of which are threaded into a respective one of the threaded bores 32. The retaining ring 22 holds the bearing cylinder 24 axially in place while the jack screws are threaded into the threaded bores 32, in through an outer face of the bearing cylinder and out through an inner face of the bearing cylinder, so as to apply pressure to the hardened washer 26, and in turn, to the seal disk 28 and stack of cutter disks 16. Further turning of the jack screws 44 will apply further inward pressure on the hardened washer 26 and seal plate 28, thereby securing the stack of cutter disks 16, 18 in a compact relationship on the shear cartridge against a flange (which may be another stack tightener) on an opposite end of the rotor shaft 20. Accordingly, because the present embodiment of the invention acts as both a stack tightening apparatus and a journal bearing, the number of components for the shear shredding assembly is reduced and the size requirements for the shear shredding assembly are also reduced.

It is within the scope of the invention to utilize the combination of stack tightener and journal bearing assembly 10 on both ends of the stack of cutter disks (journaled onto opposite ends of the frame). Furthermore, while the use of the retaining ring is preferred to prevent the bearing cylinder 24 from sliding axially along the rotor shaft 20 away from the cutter disks 16 during the tightening of the jack screws 44, it is within the scope of the invention to utilize other mechanisms for retaining the bearing cylinder 24 in place.

Figure 4:
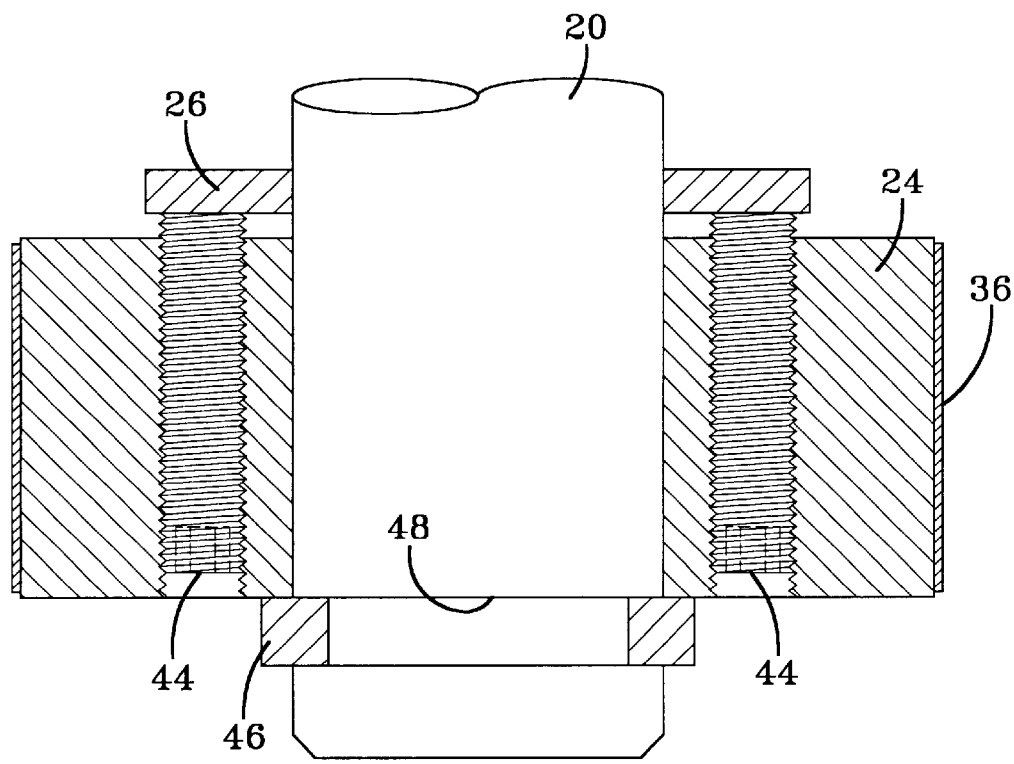
FIG. 4 is a cross-sectional top view of the embodiment of FIG. 1 showing an alternate fastener for retaining the bearing cylinder in an axial position along the rotor shaft.
Figure 5:
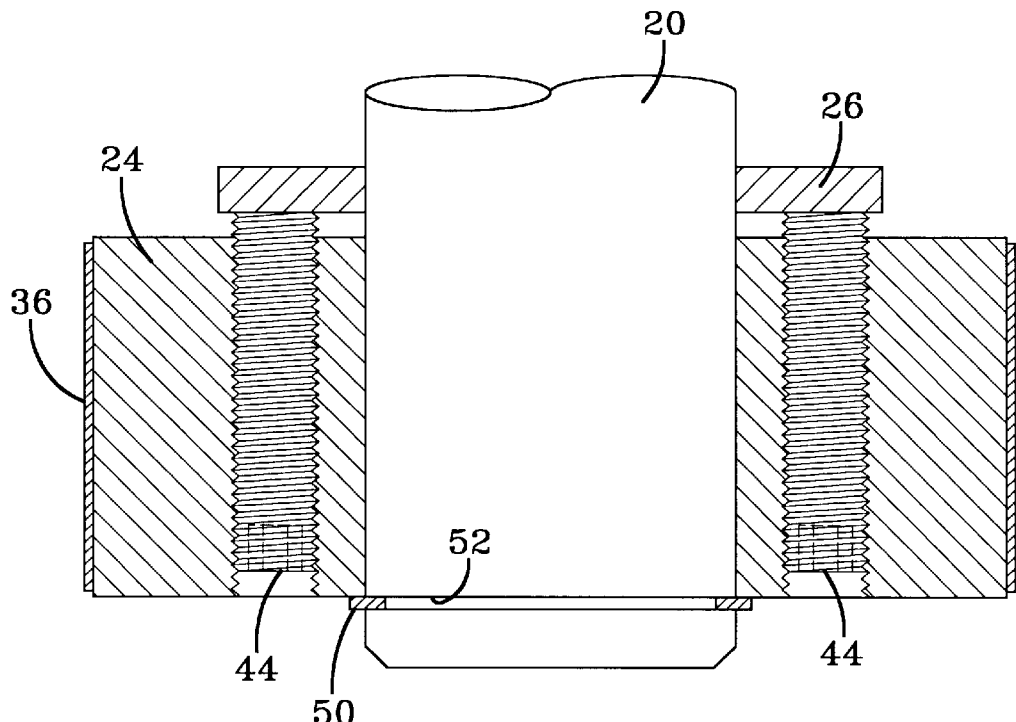
FIG. 5 is a cross-sectional top view of the embodiment of FIG. 1 showing another alternate fastener for retaining the bearing cylinder in an axial position along the rotor shaft.
Figure 6:
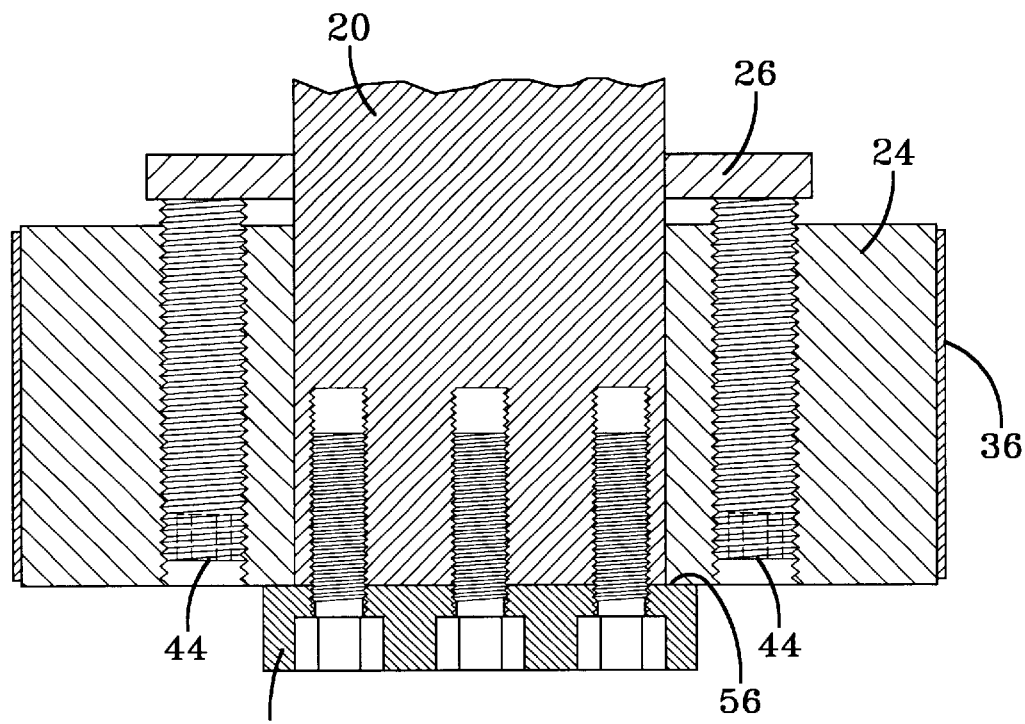
FIG. 6 is a cross-sectional top view of the embodiment of FIG. 1 showing another alternate fastener for retaining the bearing cylinder in an axial position along the rotor shaft.
Figure 7:
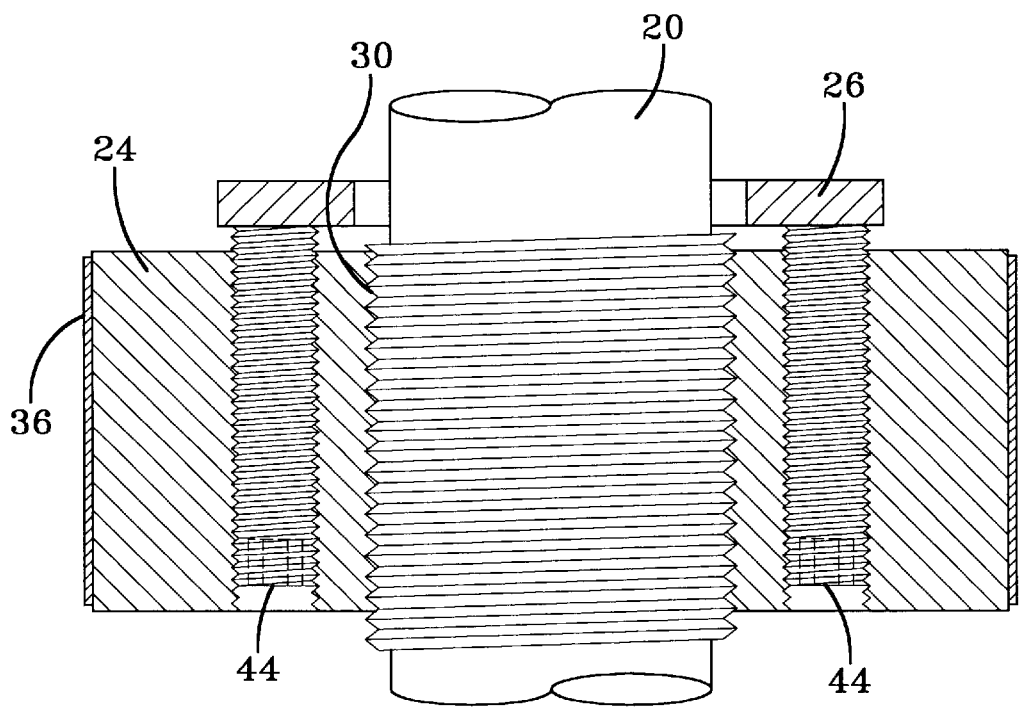
FIG. 7 is a cross-sectional top view of the embodiment of FIG. 1 showing another alternate fastener for retaining the bearing cylinder in an axial position along the rotor shaft.

For example, as shown in FIG. 4, the retaining ring may be in the form of a split collar 46 received in an annular groove 48 milled into the outer circumferential surface of the rotor shaft 20. As shown in FIG. 5, the retaining ring may also be in the form of a snap ring 50 positioned within a correspondingly sized annular recess 52 milled into the outer circumferential surface of the rotor shaft 20. As shown in FIG. 6, an alternate fastener for retaining the bearing cylinder 24 in axial position during the tightening of the jack screws 44 it is a backing plate 54 bolted onto the end of the rotor shaft so as to form a radially extending flange 56 against which the bearing cylinder 24 abuts. As shown in FIG. 7, another alternate configuration of the fastener is a threaded engagement between the rotor shaft 20 and the inner circumferential surface of the central bore 30 extending through the cylindrical bearing 24. Other alternative fasteners or means for retaining the bearing cylinder 24 in axial position along the rotor shaft include a unitary construction of the rotor shaft and cylindrical bearing, the use of pins or bolts to fasten the rotor shaft to the cylindrical bearing.

Figure 8:
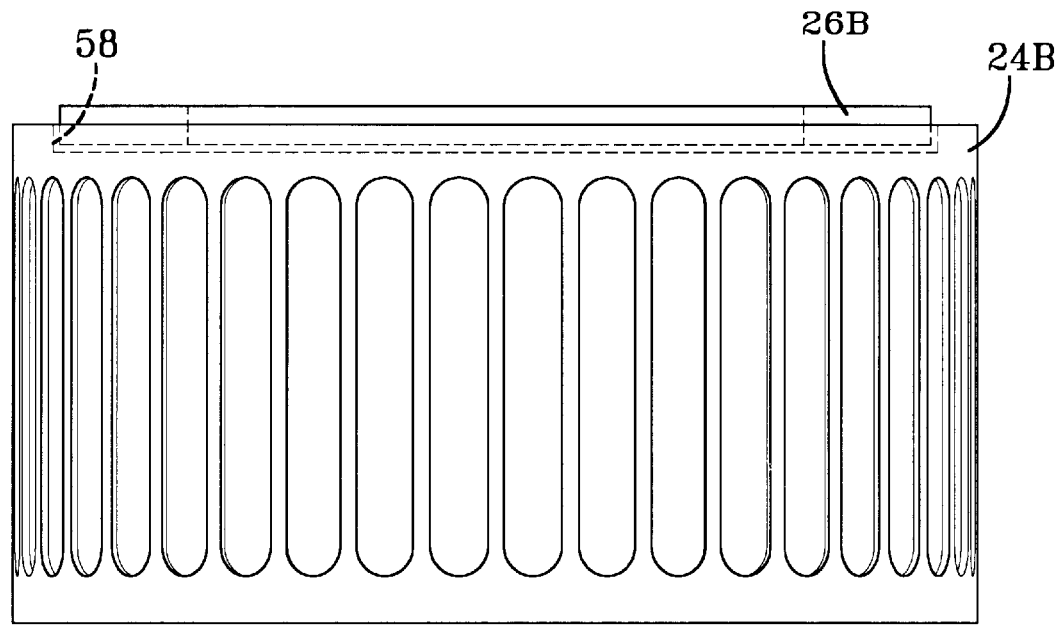
FIG. 8 is a top view of an alternate configuration of the bearing cylinder and hardened washer of the present invention.
Figure 9:
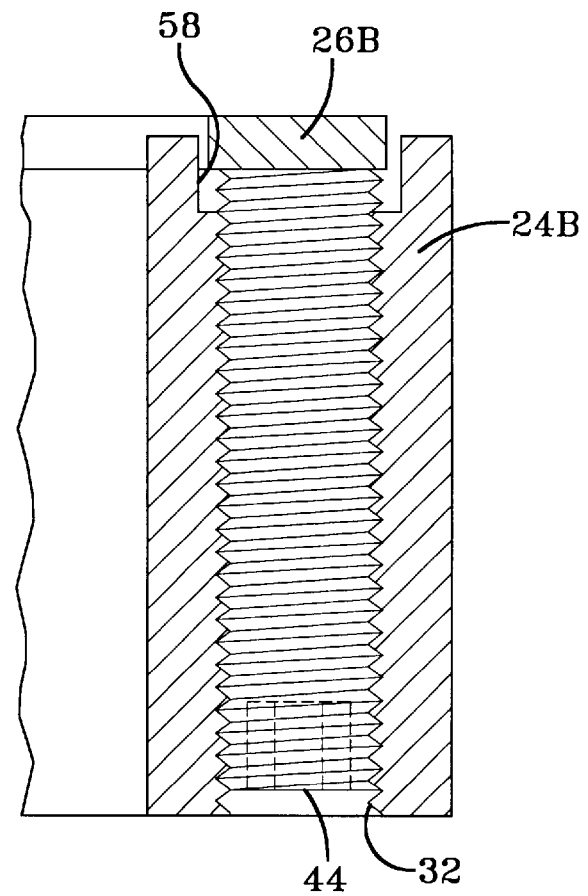
FIG. 9 is a cross-sectional view of a portion of the configuration illustrated in FIG. 8.

As shown in FIGS. 8 and 9, an alternate embodiment of the bearing cylinder 24*b* and the hardened washer 26*b* act to substantially reduce the amount of contamination buildup between the hardened washer and the plurality of jack bolts 44. In this embodiment, the bearing cylinder 24*b* includes an annular depression 58 formed into the inner, radially extending side surface of the bearing cylinder 24*b*, which is in alignment with the plurality of threaded bores 32 so that the threaded bores open into the recess 58. The hardened washer 26*b* is shaped to have a portion extending into the annular recess 58. Therefore, in operation, the hardened washer 26*b* acts as a piston to substantially reduce the amount of contaminants built up between the hardened washer and the plurality of jack bolts.

Referring again to FIG. 1, the preferred embodiment of the present invention includes an annular seal 60 retained against an annular shoulder 62 of the frame 14 by an attachment ring 64, which is in turn bolted to the frame by bolts 66. The inner circumferential surface of the sealing ring 60 abuts against the outer circumferential surface of the seal disk 28 to substantially reduce the amount of contaminants or other materials that enter through the opening in the frame from the area of the cutter disks 16.

Figure 10:
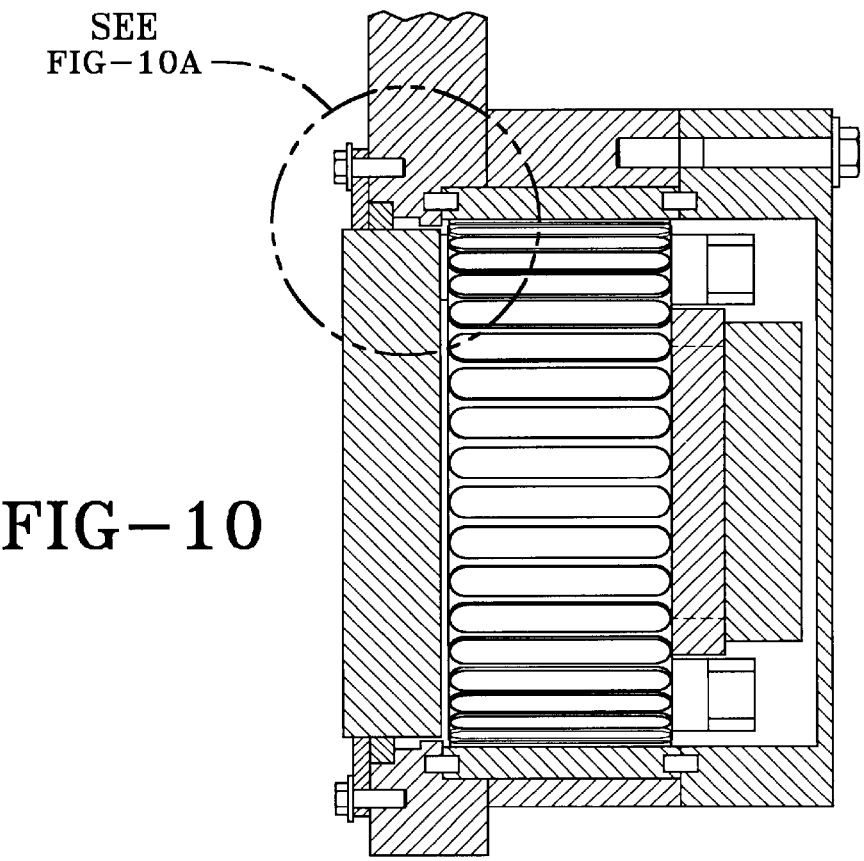
FIG. 10 is a cross-sectional top view of an alternate embodiment of the combination stack-tightener and journal bearing assembly, including a magnified detail of the rotary seal components.
Figure 10A:
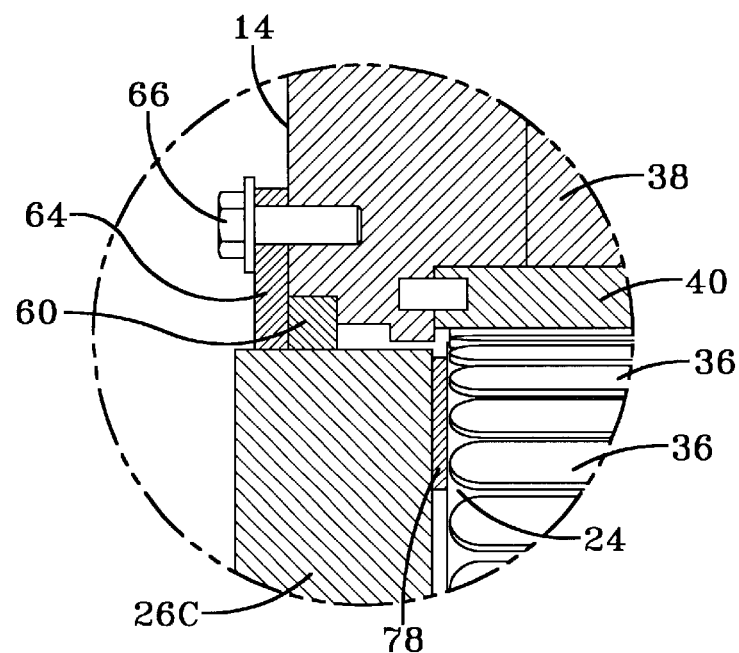

As shown in FIG. 10, in yet another alternate embodiment of the present invention, the width of the hardened washer 26*c* is increased so that the outer circumferential surface of the hardened washer abuts against the inner circumferential surface of the seal 66, thereby eliminating the need for the additional seal plate 28 shown in FIG. 1.

Figure 11:
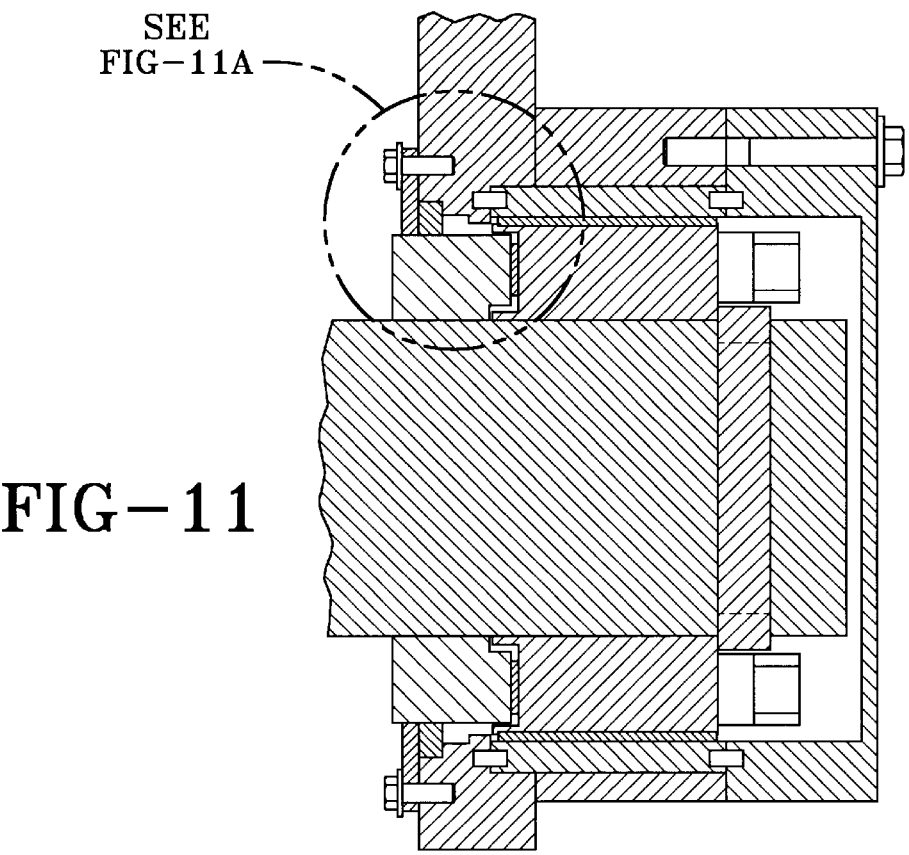
FIG. 11 is a cross-sectional top view of another alternate embodiment of the combination stack-tightener and journal bearing assembly, including a magnified detail of the rotary seal components.
Figure 11A:
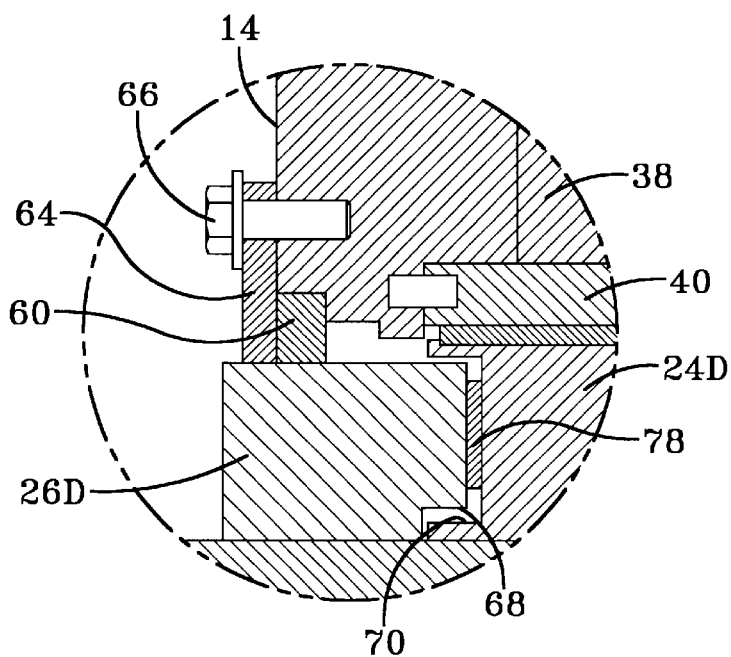

As shown in FIG. 11, in yet another alternate embodiment of the present invention, the hardened washer 26*d* is not only widened so as to provide the outer circumferential surface to seal against the seal 60, but also includes an annular projection 68 which is received within a correspondingly sized annular recess 70 milled into the inner, radially extending side surface of the bearing cylinder 24*d*. Accordingly, this embodiment acts in a similar fashion as to the embodiment shown in FIGS. 8 and 9, where the annular projection 68 acts as a piston to substantially eliminate the contamination buildup between the hardened washer 26*d* and the plurality of jack bolts 44.

Figure 12:
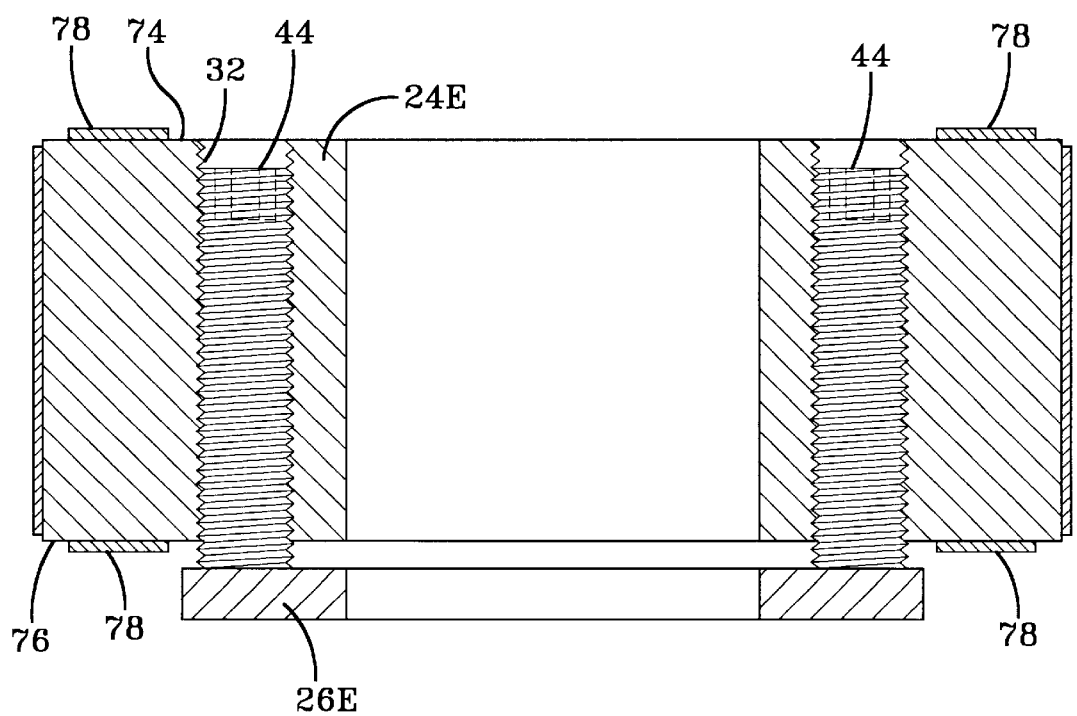
FIG. 12 is a cross-sectional top view of an alternate embodiment of the bearing cylinder and hardened washer of the present invention.

As shown in FIG. 12, in yet another alternate embodiment of the present invention, the bearing cylinder 24*e* includes a plurality of radially extending recesses circumferentially arranged about the inner radially extending side surface 74 and outer radially extending side surface 76, where the recesses receive a corresponding plurality of abrasion-resistant, self-lubricating bearing inserts 78. The notches and corresponding inserts 78 preferably extend approximately from the threaded bores 32 radially outward to the outer circumferential surface of the bearing cylinder 24*e*. Therefore, when the bearing cylinder 24*e* is received within a correspondingly shaped raceway, the inserts 78 are provided to withstand both perpendicular moment loads and the thrust loads borne by the bearing assembly. In this embodiment, it is noted that the hardened washer 26*e* has an outer diameter that is sufficiently sized such that the jack screws 44 have full contact with the hardened washer 26*e*, yet small enough so that the hardened washer 26*e* does not interfere with the outer raceway in contact with the radially extending inserts 78.

The present invention also provides a method for forming the bearing cylinders described above, which includes the steps of: (a) forming a cylindrical member having an outer circumferential bearing surface; (b) forming a plurality of recesses in the outer circumferential bearing surface; (c) attaching a plurality of solid, abrasion-resistant, polyamide friction members into the recesses such that a portion of the friction members protrudes outwardly therefrom; (d) turning the cylinder member to remove material from the protruding portions of the friction members such that a selective overall dimensional tolerance of the cylinder is achieved; and (e) assembling the bearing by inserting the cylinder into an outer raceway. Accordingly, by constructing the bearing cylinder in such a way, the bearing assembly of the present invention is easily rebuildable and refurbishable. When the bearing cylinder of the present invention is required to be refurbished, the old inserts are removed and new, oversized inserts are inserted, and the oversized inserts are milled to the required tolerances according to the diameter of the inner raceway. Therefore, even if the outer raceway wears, and thus has a greater outer diameter than its original form, the refurbished bearing cylinder will be virtually guaranteed to fit if the milling of the inserts is made in accordance with the changed inner diameter of the raceway.

While the bearing cylinders of the specific embodiments described above employ the self-lubricating, abrasion-resistant polyamide material inserts on the outer circumferential surface to provide at least a portion of the circumferential bearing surface, it is within the scope of the invention that the bearing cylinder employ other conventional forms of plain bearing surfaces as known to those of ordinary skill in the art; and it is also within the scope of the invention that the bearing cylinder employ roller bearing elements circumferentially distributed thereabout. Thus, it is within the scope of the present invention to provide a bearing apparatus that includes: (a) a bearing cylinder concentrically positioned on the rotor shaft between the rotor element and a first end of the rotor shaft, where the bearing cylinder includes a plurality of axially extending threaded bores distributed about the rotor shaft and extending completely through the bearing cylinder and includes, at least, an outer circumferential bearing surface; (b) a pressure ring, such as a hardened washer, concentrically positioned on the rotor shaft between the bearing cylinder and the rotor element; (c) a retainer, such as those described above, for preventing the bearing cylinder from moving axially along the rotor shaft away from the rotor element; and (d) a plurality of jack screws threaded into the threaded bores for forcing the pressure ring and bearing cylinder away from one another, thereby forcing the pressure ring axially against the rotor element.

It is also within the scope of the present invention that the annular depression (formed into the inner, radially extending side surface of the bearing cylinder) in combination with the annular portion of the hardened washer extending into this annular depression be applied to other apparatuses (in addition to journal bearings) for applying an axial load to an element extending from a shaft. Such other apparatuses could include the line of commercially available Super-Bolt™ products (described in U.S. Pat. No. RE33,490). Therefore, it is within the scope of the invention to provide an apparatus for applying an axial load to an element extending from (or positioned on) a shaft that includes: (a) a cylinder concentrically positioned on the shaft between the element and a first end of the shaft, where the cylinder includes a plurality of axially extending threaded bores distributed about the shaft and extend completely through the cylinder and an annular depression extending into the inner side surface of the cylinder, where each of the axially extending threaded bores open into the annular depression; (b) a pressure ring, such as a hardened washer, concentrically positioned on the shaft axially between the element and the cylinder, where the pressure ring includes an annular portion extending into the annular depression of the cylinder; (c) a retainer, such as a flange or a threaded engagement between the cylinder and the shaft (or any other retainer described herein), for preventing the cylinder from moving axially along the shaft away from the element; and (d) a plurality of jack screws threaded into the respective plurality of threaded bores, into the outer side surface of the cylinder and out through the annular depression in the inner side surface of the cylinder, forcing the pressure ring and cylinder away from one another, thereby forcing the pressure ring axially against the element.

While the forms of apparatuses herein described constituted preferred embodiments of the present invention, it is to be understood that other forms of apparatus may be employed without departing from the scope of the invention.

What is claimed is:

1. An apparatus for axially stressing a rotor element carried on a rotor shaft, comprising:

a bearing cylinder concentrically positioned on the rotor shaft between the rotor element and a first end of the rotor shaft, the bearing cylinder including an inner radially extending side surface facing towards the rotor element, an outer radially extending side surface facing away from the rotor element, a plurality of axially extending threaded bores distributed about the rotor shaft and extending completely through the bearing cylinder, and a plurality of recesses formed into the outer circumferential surface of the bearing cylinder;

a pressure ring concentrically positioned on the rotor shaft between the bearing cylinder and the rotor element;

a retainer for preventing the bearing cylinder from moving axially along the rotor shaft away from the rotor element;

a plurality of jack screws threaded into the plurality of threaded bores, in through the outer side surface of the bearing cylinder and out through the inner side surface of the bearing cylinder, forcing the pressure ring and bearing cylinder away from one another, thereby forcing the pressure ring axially against the rotor element; and a plurality of inserts made of an abrasion resistant material, each of the inserts being positioned within a corresponding one of the recesses so as to provide a bearing surface on the bearing cylinder.

2. The apparatus of claim 1, wherein each of the inserts include a portion protruding radially from the corresponding one of the recesses.

3. The apparatus of claim 2, wherein the inserts are formed from a reinforced carbon-fiber filled polyamide resin material.

4. The apparatus of claim 3, wherein the inserts extend in a substantially axial direction approximately along the entire axial length of the bearing cylinder.

5. The apparatus of claim 4, wherein the inserts are substantially oblong in shape.

6. The apparatus of claim 1, wherein the pressure ring is made from a hardened metallic material.

7. The apparatus of claim 6, wherein:

the bearing cylinder includes an annular depression extending into the inner side surface of the bearing cylinder, each of the plurality of axially extending threaded bores opening into the annular depression; and the pressure ring includes an annular portion extending into the annular depression.

8. The apparatus of claim 1, wherein:

at least one of the inner and outer side surfaces of the bearing cylinder include a plurality of depressions; and the apparatus further comprises a second plurality of inserts made of an abrasion resistant material respectively positioned within the plurality of depressions in the one side surface of the bearing cylinder.

9. The apparatus of claim 8, wherein the other one of the inner and outer side surfaces of the bearing cylinder also include a plurality of depressions and a third plurality of inserts made of an abrasion resistant material respectively positioned therein.

10. The apparatus of claim 8, wherein the second plurality of inserts extend substantially radially and include a portion protruding axially out from the respective plurality of depressions in the one side surface of the bearing cylinder.

11. The apparatus of claim 1, wherein the retainer is a flange radially extending from the rotor shaft.

12. The apparatus of claim 11, wherein the flange is a snap ring received within an annular groove of the rotor shaft, the snap ring being positioned axially between the bearing cylinder and the first end of the rotor shaft.

13. The apparatus of claim 11, wherein the flange is a split collar received within an annular groove of the rotor shaft, the split collar being positioned axially between the bearing cylinder and the first end of the rotor shaft.

14. The apparatus of claim 11, wherein the flange is a backing plate attached to the first end of the rotor shaft.

15. The apparatus of claim 1, wherein the retainer is an outer circumferential threaded surface of the rotor shaft and a correspondingly threaded inner circumferential surface of the bearing cylinder.

16. The apparatus of the claim 1, wherein the retainer is the unitary formation of the rotor shaft and bearing cylinder.

17. A bearing assembly comprising:

an outer cylindrical race, having an inner cylindrical bearing surface;

a rotor shaft carrying a rotor element thereon;

a bearing cylinder concentrically positioned on the rotor shaft between the rotor element and a first end of the rotor shaft and journaled by the cylindrical race, the bearing cylinder including an inner radially extending side surface facing towards the rotor element, an outer radially extending side surface facing away from the rotor element, a plurality of axially extending threaded bores distributed about the rotor shaft and extending completely through the bearing cylinder, and a plurality of recesses formed into the outer circumferential surface of the bearing cylinder;

a pressure ring concentrically positioned on the rotor shaft between the bearing cylinder and the rotor element;

a retainer for preventing the bearing cylinder from moving axially along the rotor shaft away from the rotor element;

a plurality of jack screws threaded into the plurality of threaded bores, in through the outer side surface of the bearing cylinder and out through the inner side surface of the bearing cylinder, forcing the pressure ring and bearing cylinder away from one another, thereby forcing the pressure ring axially against the rotor element; and a plurality of inserts made from an abrasion resistant material, each of the inserts being positioned within a corresponding one of the recesses so as to provide a bearing surface on the bearing cylinder facing the inner cylindrical bearing surface of the outer cylindrical race.

18. The bearing assembly of claim 17, wherein each of the inserts include a portion protruding radially out from the corresponding one of the plurality of recesses.

19. The bearing assembly of claim 18, wherein the inserts are formed from a solid, reinforced carbon-fiber filled polyamide resin material, extend in a substantially axial direction approximately along the entire axial length of the bearing cylinder, and are substantially oblong in shape.

20. The bearing assembly of claim 17, wherein:
the cylindrical race is mounted to a frame, the frame having an opening for receiving at least the rotor shaft therethrough; and
the bearing assembly further comprises an annular seal extending radially inward from the opening in the frame.

21. The bearing assembly of claim 20, wherein the annular seal abuts an outer circumferential surface of the pressure ring.

22. The bearing assembly of claim 21, wherein:
the bearing cylinder includes an annular depression extending into the inner side surface of the bearing cylinder, each of the plurality of axially extending bores opening into the annular depression; and
the pressure ring includes an annular portion extending into the annular depression.

23. The bearing assembly of claim 20, further comprising a hardened seal ring concentrically positioned on the rotor shaft between the rotor element and the pressure ring, wherein the annular seal abuts an outer circumferential surface of the hardened seal ring.

24. For use with a shear cartridge of a shear shredder apparatus, which includes a rotor shaft and a stack of cutter disks and associated spacer disks positioned on the rotor shaft, a combination stack tightener and journal bearing assembly comprising:
a retaining flange adapted to be fixedly mounted approximate a first end of the rotor shaft;
a pressure ring adapted to be positioned on the rotor shaft between the retaining flange and the stack of cutter disks;
a bearing cylinder adapted to be positioned on the rotor shaft between the retaining flange and the pressure ring, the bearing cylinder including an inner radially extending side surface adapted to face the pressure disk, an outer radially extending side surface opposite the inner side surface, a central bore adapted to receive the shaft therethrough, a plurality of axially extending threaded bores distributed about the central bore and extending completely through the bearing cylinder, and a plurality of recesses formed into the outer circumferential surface of the bearing cylinder;
a plurality of jack screws threaded into the plurality of threaded bores, in through the outer side surface of the bearing cylinder and out through the inner side surface, so as to force the pressure ring and bearing cylinder away from one another, thereby securing the bearing cylinder against the retaining flange and the pressure ring against the stack of cutter disks; and
a plurality of inserts made of an abrasion resistant material positioned within the respective plurality of recesses and shaped such that a portion of each insert protrudes above the circumferential surface of the bearing cylinder, thereby providing a bearing surface on the bearing cylinder.

25. The combination stack tightener and journal bearing assembly of claim 24, further comprising a seal ring adapted to be positioned on the rotor shaft between the stack of cutter disks and the pressure ring.

26. The combination stack tightener and journal bearing assembly of claim 24, wherein the recesses are oblong in shape and extend in an axial direction and are spaced substantially evenly about a circumference of the outer circumferential surface of the bearing cylinder.

27. The combination stack tightener and journal bearing assembly of claim 24, wherein the abrasion resistant material is a solid, self-lubricating polyamide resin material.

28. A shear cartridge for a shear shredder apparatus comprising:
a rotor shaft;
a stack of cutter disks and associated spacer disks received on the rotor shaft; and
at least one stack tightener positioned on an end of the rotor shaft and applying pressure upon the stack of cutter disks positioned between the stack tightener and an opposite end of the shaft;
the stack tightener including,
a bearing cylinder positioned on the rotor shaft, the bearing cylinder including an inner radially extending side surface facing the stack of cutter disks, an outer radially extending side surface opposite the inner side surface, a central bore receiving the rotor shaft, a plurality of axially extending, threaded bores distributed around the central bore and extending completely through the bearing cylinder, and a plurality of recesses formed into the outer circumferential surface of the bearing cylinder,
a pressure ring positioned on the shaft between the bearing cylinder and is the stack of cutter disks,
a means for preventing the bearing cylinder from sliding axially on the rotor shaft away from the stack of cutter disks,
a plurality of jack screws threaded into the plurality of threaded bores, in through the outer side surface of the bearing cylinder and out through the inner side surface of the bearing cylinder, so as to force the pressure ring and bearing cylinder away from one another, thereby securing the pressure ring against the stack of cutter disks, and
a plurality of inserts made of an abrasion resistant material respectively positioned within the plurality of recesses and shaped such that a portion of each insert protrudes radially above the outer circumferential surface of the bearing cylinder, thereby providing a bearing surface on the bearing cylinder.

29. A roller assembly for a material processing apparatus comprising:
a rotor shaft;
a roller member received on the rotor shaft; and
at least one stack tightener positioned on an end of the rotor shaft and applying pressure upon the roller member positioned between the stack tightener and an opposite end of the shaft;
the stack tightener including,
a bearing cylinder positioned on the rotor shaft, the bearing cylinder including an inner radially extending side surface facing the roller member, an outer radially extending side surface opposite the inner side surface, a central bore receiving the rotor shaft, a plurality of axially extending, threaded bores distributed around the central bore and extending completely through the bearing cylinder, and a plurality of recesses formed into the outer circumferential surface of the bearing cylinder,
a pressure ring positioned on the shaft between the bearing cylinder and the stack of cutter disks,
a means for preventing the bearing cylinder from sliding axially on the rotor shaft away from the stack of cutter disks, a plurality of jack screws threaded into the plurality of threaded bores, in through the outer side surface of the bearing cylinder and out through the inner side surface of the bearing cylinder, so as to force the pressure ring and bearing cylinder away from one another, thereby securing the pressure ring against the roller member, and a plurality of inserts made of an abrasion resistant material respectively positioned within the plurality of recesses and shaped such that a portion of each insert protrudes radially above the outer circumferential surface of the bearing cylinder, thereby providing a bearing surface on the bearing cylinder.

30. An apparatus for applying an axial load to an element extending from a shaft, the shaft including a first end distal from the element, the apparatus comprising:

a cylinder concentrically positioned on the shaft between the element and the first end of the shaft, the cylinder including an inner radially extending side surface facing the element, an outer radially extending side surface facing away from the element, a plurality of axially extending threaded bores distributed about the shaft and extending completely through the cylinder, and an annular depression extending into the inner side surface of the cylinder, each of the axially extending threaded bores opening into the annular depression;

a pressure ring concentrically positioned on the shaft axially between the element and the cylinder, including an annular portion extending into the annular depression of the cylinder;

a retainer for preventing the cylinder from moving axially along the shaft away from the element; and a plurality of jack screws threaded into the respective plurality of threaded bores, in the outer side surface of the cylinder and out through the annular depression in the inner side surface of the cylinder, forcing the pressure ring and cylinder away from one another, thereby forcing the pressure ring axially against the element.

31. The apparatus of claim 30, wherein the retainer is an outer circumferential threaded surface of the rotor shaft and a correspondingly threaded inner circumferential surface of the bearing cylinder.

32. The apparatus of claim 30, wherein the pressure ring is made from a hardened metallic material.

33. The apparatus of the claim 30, wherein the retainer is the unitary formation of the rotor shaft and bearing cylinder.

34. The apparatus of claim 30, wherein the retainer is a flange radially extending from the rotor shaft.

35. The apparatus of claim 30, wherein the bearing cylinder is a plain bearing cylinder.

36. The apparatus of claim 30, wherein the bearing cylinder includes a plurality of roller bearing elements distributed circumferentially thereabout.

37. A bearing apparatus for axially stressing a rotor element carried on a rotor shaft, comprising:

a bearing cylinder concentrically positioned on the rotor shaft between the rotor element and a first end of the rotor shaft, the bearing cylinder including an inner radially extending side surface facing towards the rotor element, an outer radially extending side surface facing away from the rotor element, and a plurality of axially extending threaded bores distributed about the rotor shaft and extending completely through the bearing cylinder;

a pressure ring concentrically positioned on the rotor shaft between the bearing cylinder and the rotor element;

a retainer for preventing the bearing cylinder from moving axially along the rotor shaft away from the rotor element; and a plurality of jack screws threaded into the plurality of threaded bores, in through the outer side surface of the bearing cylinder and out through the inner side surface of the bearing cylinder, forcing the pressure ring and bearing cylinder away from one another, thereby forcing the pressure ring axially against the rotor element.

38. The apparatus of claim 37, wherein:

the bearing cylinder includes an annular depression extending into the inner side surface of the bearing cylinder, each of the plurality of axially extending threaded bores opening into the annular depression; and the pressure ring includes an annular portion extending into the annular depression.

39. The apparatus of claim 38, wherein the flange is a snap ring received within an annular groove of the rotor shaft, the snap ring being positioned axially between the bearing cylinder and the first end of the rotor shaft.

40. The apparatus of claim 38, wherein the flange is a split collar received within an annular groove of the rotor shaft, the split collar being positioned axially between the bearing cylinder and the first end of the rotor shaft.

41. The apparatus of claim 38, wherein the flange is a backing plate attached to the first end of the rotor shaft.

* * * * *

UNITED STATES PATENT AND TRADEMARK OFFICE
CERTIFICATE OF CORRECTION

PATENT NO. : 6,250,577 B1  Page 1 of 1
DATED : June 26, 2001
INVENTOR(S) : Larry E. Koenig It is certified that error appears in the above-identified patent and that said Letters Patent is hereby corrected as shown below:

Column 7,
Line 28, please delete "66" and insert -- 60 --.

Signed and Sealed this

Fifth Day of February, 2002

Attest:

JAMES E. ROGAN
*Attesting Officer*  *Director of the United States Patent and Trademark Office*